(No Model.)
E. S. JENNINGS.
SELF OILING WHEEL.
No. 540,494. Patented June 4, 1895.
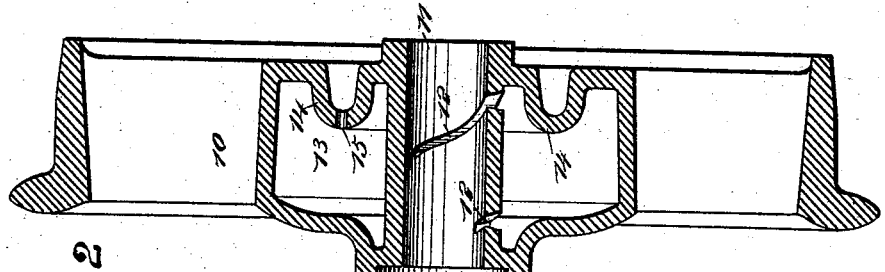
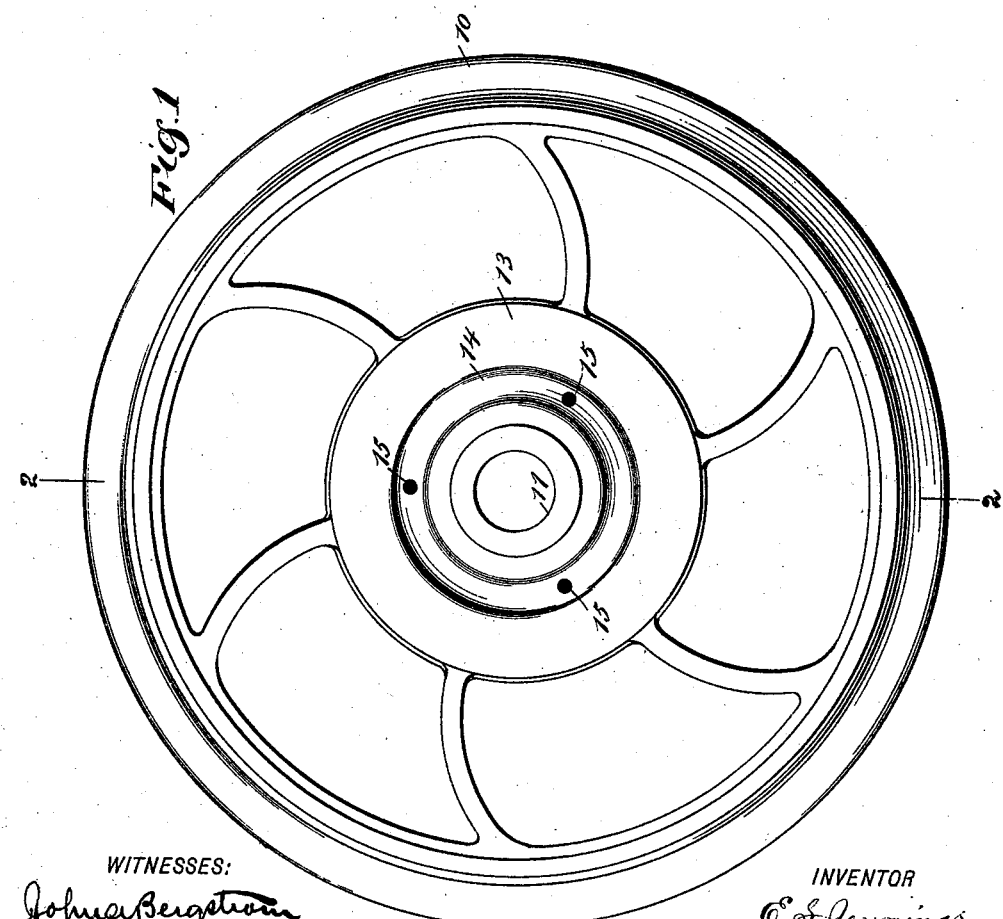

UNITED STATES PATENT OFFICE.

EBENEZER S. JENNINGS, OF POMEROY, OHIO.

SELF-OILING WHEEL.

SPECIFICATION forming part of Letters Patent No. 540,494, dated June 4, 1895.

Application filed January 15, 1895. Serial No. 534,993. (No model.)

*To all whom it may concern:*

Be it known that I, EBENEZER S. JENNINGS, of Pomeroy, in the county of Meigs and State of Ohio, have invented a new and Improved Self-Oiling Wheel, of which the following is a full, clear, and exact description.

My invention relates to improvements in self-oiling wheels and particularly to self-oiling car wheels; and the object of my invention is to produce a wheel of this class which is simple, strong and cheap, which has an oil chamber surrounding its bearing sleeve, which has the sleeve slotted in such a way as to apply the oil to the journal of the wheel throughout the entire length of said journal, which has its inlets arranged in such a way as to permit the easy entrance of oil but prevent its waste and which is also constructed so as obviate the necessity of using a cap to close the reservoir or oil chamber.

To these ends my invention consists of certain features of construction and combinations of parts, which will be hereinafter described and claimed.

Reference is to be had to the accompanying drawings, forming a part of this specification, in which similar figures of reference indicate corresponding parts in both the views.

Figure 1 is a side elevation of my improved wheel, and Fig. 2 is a cross-section on the line 2 2 of Fig. 1.

In the drawings I have illustrated a car wheel, as my invention is especially applicable to car journals, but other wheels may be made in accordance with my invention if desired. The wheel 10 is like an ordinary wheel with the exception of its bearing sleeve and oil chamber. The hub of the wheel is provided with a bearing sleeve 11 which forms the inner wall of the oil chamber 13 and which is provided with spiral slots 12 of opposite pitch and on opposite sides of the sleeve, this arrangement providing means for the oil to flow from the chamber 13 to the journal and it also insures the application of the oil to the journal throughout the entire length of the latter.

The chamber 13 entirely encircles the bearing sleeve 11, and one of its end walls is provided with an in-pressed rib or corrugation 14 which is circular and through the center of which, at necessary intervals, are oil holes 15 through which the chamber may be filled with oil. It will be noticed that these holes come in the center of the rib, so that the inner ends of the holes are on the convex part of the rib and that the holes are substantially parallel with the bearing sleeve 11, so that when the wheel revolves the oil will be thrown away from the holes and will not run out and be wasted.

It will be observed that the chamber may be partially filled with oil and that then the oil will be suently applied to the journal through the slots 12. It will also be noticed that the rib 14, besides affording a protection against the waste of oil, also serves to stiffen and strengthen the wheel.

Having thus described my invention, I claim as new and desire to secure by Letters Patent—

The combination with the wheel having the central slotted bearing sleeve, of the oil chamber encircling the said sleeve and the annular impressed rib formed on the end wall of the oil chamber, the said annular rib encircling the bearing sleeve and having a convex inner face, the outer face of the end wall of the oil chamber having a corresponding annular depression, and oil supply holes extending at intervals through the said annular rib, the holes being arranged substantially parallel with the bearing sleeve and the inner ends of the holes being at the center of the convex face of the annular rib, substantially as described.

EBENEZER S. JENNINGS.

Witnesses:
   E. C. HECOX,
   J. Q. SPEAKER.